United States Patent
Davies (10) Patent No.: US 10,661,821 B2
(45) Date of Patent: May 26, 2020

(54) STEERING COLUMN ASSEMBLY

(71) Applicant: TRW Limited, Solihull West Midlands (GB)

(72) Inventor: Niclas Davies, Birmingham West Midlands (GB)

(73) Assignee: TRW Limited, Solihull, West Midlands ( * ) Notice: Subject to any disclaimer, the term of this patent is extended or adjusted under 35 U.S.C. 154(b) by 0 days.

(21) Appl. No.: 16/336,602

(22) PCT Filed: Sep. 20, 2017

(86) PCT No.: PCT/GB2017/052790
§ 371 (c)(1),
(2) Date: Mar. 26, 2019

(87) PCT Pub. No.: WO2018/055355
PCT Pub. Date: Mar. 29, 2018

(65) Prior Publication Data
US 2020/0023883 A1    Jan. 23, 2020

(30) Foreign Application Priority Data

Sep. 26, 2016    (GB) .................................. 1616323.0

(51) Int. Cl.
*B62D 1/19*    (2006.01)
*B62D 1/184*    (2006.01)
(Continued)

(52) U.S. Cl.
CPC ............. *B62D 1/192* (2013.01); *B62D 1/184* (2013.01); *B62D 1/185* (2013.01); *B62D 1/187* (2013.01)

(58) Field of Classification Search
CPC ......... B62D 1/195; B62D 1/184; B62D 1/192
See application file for complete search history.

(56) References Cited

U.S. PATENT DOCUMENTS

| 5,787,759 A * | 8/1998 | Olgren ................... B62D 1/184 |
| | | 280/777 |
| 7,685,903 B2 * | 3/2010 | Streng .................... B62D 1/184 |
| | | 74/492 |

(Continued)

FOREIGN PATENT DOCUMENTS

| EP | 2197727 B1 | 3/2011 |
| EP | 3075632 B1 * | 2/2018 |

(Continued)

OTHER PUBLICATIONS

Great Britain Search Report, Application No. GB1616323.0, dated Mar. 27, 2017.

(Continued)

*Primary Examiner* — Nicole T Verley
(74) *Attorney, Agent, or Firm* — MacMillian, Sobanski & Todd, LLC (57) ABSTRACT

A steering column assembly is provided that includes an inner shroud portion and an outer shroud portion, the inner shroud portion extending into the outer shroud portion and including a rail. The rail includes a slot with two opposing sides, each of which has teeth. A toothed block is provided that engages with the teeth of the slot, when a clamping mechanism is actuated. The toothed block is supported by a carrier that allows the toothed block to be free to move from side-to-side when engaged with the slot, and the teeth of the slot and the toothed block are shaped such that the toothed block may engage the teeth of the slot at any position when the clamping mechanism is actuated. The teeth of a first side of the slot prevent the block from moving in a collapse direction of the assembly and the teeth of the second side of the slot permit movement in a collapse direction but apply a thrust towards the teeth of the first side. The carrier (Continued)

includes a biasing spring that urges the toothed block towards the first side of the slot.

12 Claims, 11 Drawing Sheets

(51) Int. Cl.
*B62D 1/185* (2006.01)
*B62D 1/187* (2006.01)

(56) References Cited

U.S. PATENT DOCUMENTS

| | | | | |
|---|---|---|---|---|
| 8,375,822 | B2 * | 2/2013 | Ridgway | B62D 1/184 |
| | | | | 280/775 |
| 8,505,408 | B2 * | 8/2013 | Havlicek | B62D 1/195 |
| | | | | 280/775 |
| 9,428,215 | B1 * | 8/2016 | Nagatani | B62D 1/184 |
| 9,452,772 | B2 * | 9/2016 | Owens | B62D 1/185 |
| 9,663,135 | B2 * | 5/2017 | Myohoji | B62D 1/184 |
| 9,718,490 | B2 * | 8/2017 | Tanaka | B62D 1/184 |
| 9,783,221 | B2 * | 10/2017 | Sakuda | B62D 1/195 |
| 10,011,293 | B2 * | 7/2018 | Nagatani | B62D 1/185 |
| 10,202,139 | B2 * | 2/2019 | Tanaka | B62D 1/184 |
| 10,336,362 | B2 * | 7/2019 | Bodtker | B62D 1/195 |
| 10,442,456 | B2 * | 10/2019 | Davies | B62D 1/184 |
| 2005/0016315 | A1 | 1/2005 | Breuss et al. | |
| 2007/0204714 | A1 | 9/2007 | Lutz | |
| 2016/0144885 | A1 * | 5/2016 | Tanaka | B62D 1/187 |
| | | | | 74/493 |
| 2018/0178826 | A1 * | 6/2018 | Kagawa | B62D 1/195 |
| 2019/0152510 | A1 * | 5/2019 | Shiroishi | B62D 1/192 |
| 2019/0337552 | A1 * | 11/2019 | Buzzard | B62D 1/187 |

FOREIGN PATENT DOCUMENTS

| | | | | |
|---|---|---|---|---|
| EP | 3279059 | B1 * | 5/2019 | |
| GB | 2352284 | A * | 1/2001 | B62D 1/184 |
| GB | 2515381 | A | 12/2014 | |
| JP | 2017030726 | A * | 2/2017 | B62D 1/195 |
| WO | 2009068646 | A1 | 6/2009 | |
| WO | 2016012788 | A1 | 1/2016 | |

OTHER PUBLICATIONS

PCT International Search Report and Written Opinion, Application No. PCT/GB2017/052790, dated Dec. 1, 2017.

* cited by examiner

Figure 12c ized to the invention.

STEERING COLUMN ASSEMBLY

CROSS-REFERENCE TO RELATED APPLICATIONS

This application is a national stage of International Application No. PCT/GB2017/052790, filed Sep. 20, 2017, the disclosures of which are incorporated herein by reference in entirety, and which claimed priority to Great Britain Patent Application No. 1616323.0, filed Sep. 26, 2016, the disclosures of which are incorporated herein by reference in entirety.

BACKGROUND TO THE INVENTION

This invention relates to improvements in steering column assemblies. More particularly, the invention relates to steering column assemblies including a positive locking system provided by the interaction between a toothed block and a rack.

It is known to provide a collapsible steering column assembly comprising a steering shaft that is supported within a steering column shroud. To prevent significant injury to the driver in the event of a crash the steering column should be able to collapse as an axial load is applied through the steering wheel, for instance in a front impact where an unrestrained driver is thrown onto the steering wheel.

A typical collapsible steering column assembly comprises a telescopic shroud, having an outer shroud portion and an inner shroud portion, an end of the inner shroud portion extending into the outer shroud portion. The outer shroud portion may be located closer to the steering wheel, or further from the steering wheel than the inner shroud portion. A telescopic steering shaft, also having an upper and lower shaft part, is supported inside the shroud through one or more bearing assemblies. The steering wheel is fixed to the upper shaft portion.

The part of the shroud closest to the wheel must be able to move, or collapse, during a crash so as to allow the steering wheel to move forwards relative to the vehicle body but be prevented from moving during normal use. There is also a need to fix the shroud relative to the vehicle body to define the rake position of the steering wheel. This is typically achieved by a clamp mechanism that secures the shroud to a support bracket that is in turn fixed to the vehicle body, perhaps to a cross beam provided behind the dashboard of the vehicle. The clamp mechanism may be adjustable to permit reach adjustment, or rake adjustment, or both, of the steering wheel. In the event of a crash the shroud must be able to move, and this is achieved if it is able to break free of the clamp mechanism, or for the support bracket to be able to break free of the vehicle body, to allow the steering column assembly to collapse telescopically.

A lever may be provided on an end of the a clamp bolt that forms a part of the clamp mechanism that the driver can push or pull to rotate the clamp bolt and thereby operate the clamp mechanism.

Steering column assemblies are known which include a clamp mechanism that relies solely on friction when locked to prevent unwanted movement of the column assembly. The clamp mechanism can be unlocked and locked by movement of a locking lever or, sometimes, electrically using a motor or perhaps hydraulically or pneumatically. These columns can typically resist relatively high radial and/or axial forces applied at the steering wheel before slipping.

However, it is increasingly a requirement from car manufacturers that there should be no substantial movement of the steering column assembly when forces of up to 2000 N or higher (depending on the application) are applied. The objective is to prevent unwanted movements of the steering wheel in a crash so that the deployment of the air bag is ideally controlled.

For this, friction alone is often insufficient, as massive clamp forces would be needed to achieve this. Some method of Positive Locking is needed.

There is a well-known problem with the type of "Positive-Locking" column which uses rows of inter-engaging teeth whereby, prior to operation of the locking lever by the driver, the selected steering wheel axial position has resulted in exact alignment of the tips of one row of teeth with the tips of the set of teeth with which they are supposed to engage. Inter-engaging of the teeth during the clamping operation is thereby blocked and, if excessive force is applied by the driver to the clamp lever to force it to complete its travel, permanent damage can occur to the tips of the teeth at high bolt tensions. At the very least, such a Tooth-on-Tooth occurrence will require the driver to consciously re-release the lever, find a slightly different wheel position and then re-engage the lever. Unless special means are provided to overcome this problem, then it is likely to occur occasionally during adjustments. This is undesirable.

SUMMARY OF THE INVENTION

In accordance with a first aspect of the invention, there is provided a steering column assembly comprising:
  a telescopic shroud having an outer shroud portion and an inner shroud portion, an end of the inner shroud portion extending into the outer shroud portion,
  a rail fixed to the inner shroud portion including a slot that extends axially along the inner shroud portion, the slot defining two opposing sides which each side carry a row of teeth, the two rows thereby being spaced apart from one another with the teeth extending towards each other;
  a clamp bolt that extends perpendicular to the shroud that may be rotated around its axis by operation of a locking lever,
  a toothed block having a row of teeth on each side, the pitch between teeth of each row being equal to, or a whole multiple of, the pitch of the teeth of the corresponding row of the slot,
  the toothed block being supported by a carrier that moves in response to rotation of the clamp bolt to in turn move the toothed block between a clamped position in which the toothed block is located in the slot with the teeth of the toothed block in the same plane as the teeth of the slot and an unclamped position in which the toothed block is held such that the teeth of the toothed block are out of the plane of the teeth of the slot;
  the carrier supporting the toothed block such that the toothed block is free to move from side to side when in the slot,
  the teeth of the two rows of teeth of the slot and the teeth of the two rows of teeth of the toothed block are shaped such that for any given position of the inner shroud portion relative to the outer shroud portion the toothed block is free to move into the slot when the carrier is in moved into the clamped position from the unclamped,
  wherein the teeth of a first side of the slot and the corresponding teeth of the toothed block when in flank to flank contact prevent axial movement of the toothed block along the slot in a direction corresponding to a telescopic collapse of the shroud and in that the teeth of a second side of the slot and the corresponding teeth of the toothed block permit axial movement of the toothed block along the slot in a direction corresponding to a collapse of the shroud whilst applying a thrust to the toothed block that moves the toothed block sideways across the slot so that the flanks of the teeth of the first side face the flanks of the corresponding teeth of the toothed block, and characterised in that the carrier includes a biasing spring which, when the assembly is in the unclamped position, biases the toothed block in a direction substantially perpendicular to the movement between the clamped and unclamped positions, towards the teeth of the first side of the slot.

By providing a biasing spring, the toothed block is able to be biased such that, when in the unclamped position, it is urged to a position in which, when clamped, it will be engage the teeth of the first side of the slot without requiring lateral movement during a collapse, and/or when in the clamped position within the slot, it is urged into engagement with the teeth of the first side of the slot. This provides an additional feature which ensures that the toothed block is in an optimum position to engage the teeth of the first side of the slot as soon as possible during a crash. The biasing spring may also prevent or limit rattle of the carrier element, giving a quality feel to the user.

The teeth of the first side of the slot and of the corresponding side of the toothed block may be shaped such that the toothed block is deflected towards the second side of the slot, overcoming the force of the biasing spring, in the event that the block and teeth of the slot are in a tooth on tooth alignment.

The carrier for the tooth block may be guided by a portion of the outer shroud and the biasing spring may be configured to exert a biasing force on the outer shroud. Note that the outer shroud does not move axially in a crash or during adjustment, only the inner shroud moves axially. During adjustment the rail moves relative to the unclamped block. During a crash the movement of the rail causes the block also to move and break free from the outer shroud portion.

To permit the block to break free from the outer shroud portion, the block may be connected to the carrier by a frangible shear pin or other breakable connection.

The biasing spring may be movable with the carrier.

In one arrangement, the biasing spring may be housed and/or retained within a spring housing. The spring housing can therefore provide protection and/or wear resistance to the spring and/or to components that would otherwise by in contact with the spring. It may also be used to aid the assembly of the device.

The spring housing may surround or substantially surround an outer surface of the biasing spring.

Preferably, the spring housing may include at least one retaining element which, in use, is configured to restrict movement of the biasing spring in at least one direction.

The at least one retaining element may be receivable within a corresponding aperture in the biasing spring. Additionally, the at least one retaining element may include a chamfer angled such that it faces in the direction. in which the biasing spring is introduced, during assembly. The chamfer allows, during assembly, the biasing spring to be pushed over the retaining element relatively easily, whilst making it difficult to remove the biasing spring in the opposite direction, once in position.

The spring housing may be attachable to the carrier.

The spring housing may include a low-friction surface on a portion that contacts the inner shroud. The low-friction surface reduces resistance of movement between the spring housing and the guiding surface of the inner shroud. Thus, friction may be limited even though a biasing force is present normal to the inner shroud. Alternatively or additionally, the guiding portion of the inner shroud itself may include a low-friction surface on the portion that contacts the spring housing.

The biasing spring may be a leaf spring.

Other advantages of this invention will become apparent to those skilled in the art from the following detailed description of the preferred embodiments, when read in light of the accompanying drawings.

DETAILED DESCRIPTION OF THE INVENTION

Figure 1:
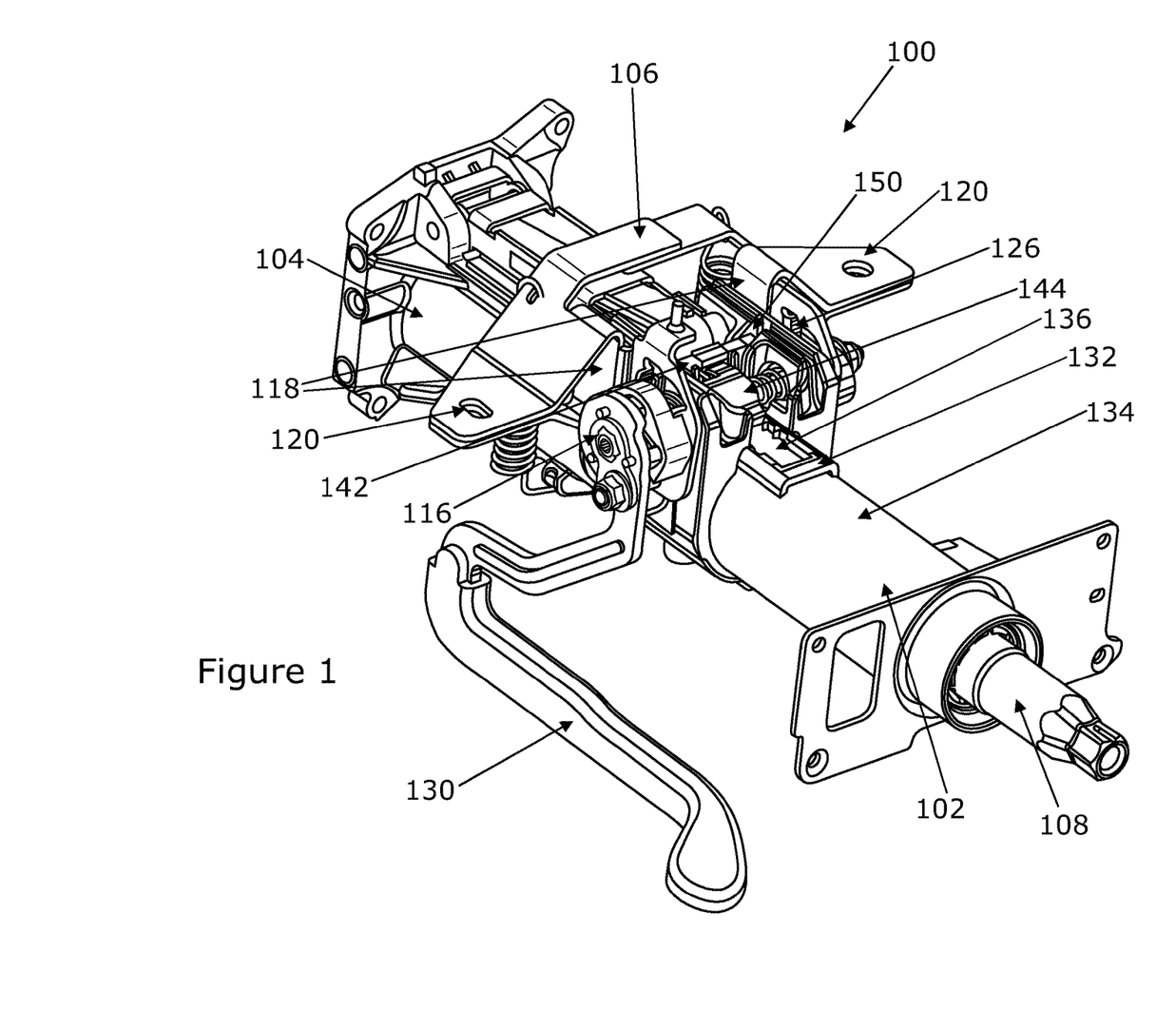
FIG. 1 depicts an isometric view of a steering column assembly in accordance with the first aspect of the invention.
Figure 2:
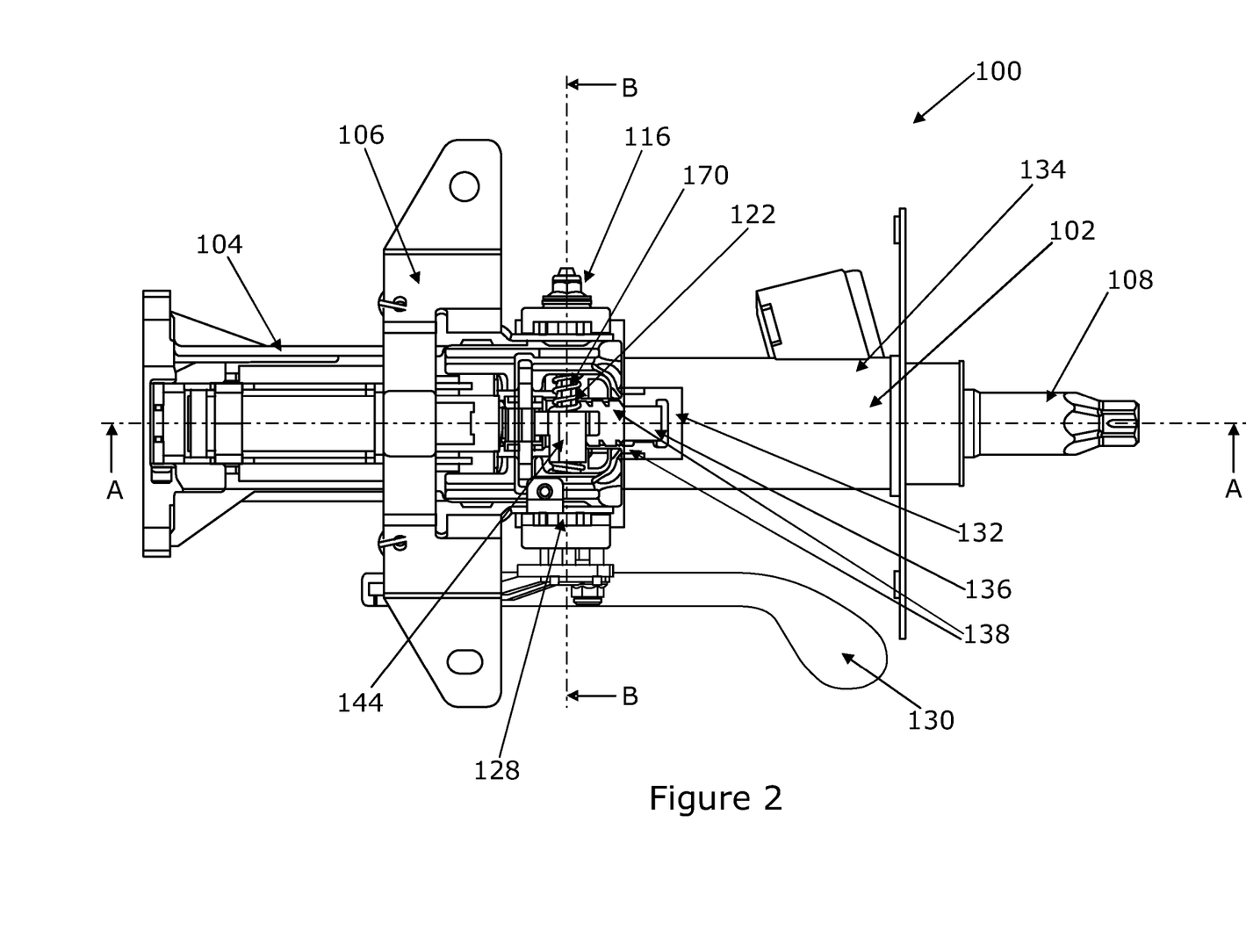
FIG. 2 shows a plan view of the steering column assembly of FIG. 1.
Figure 3:
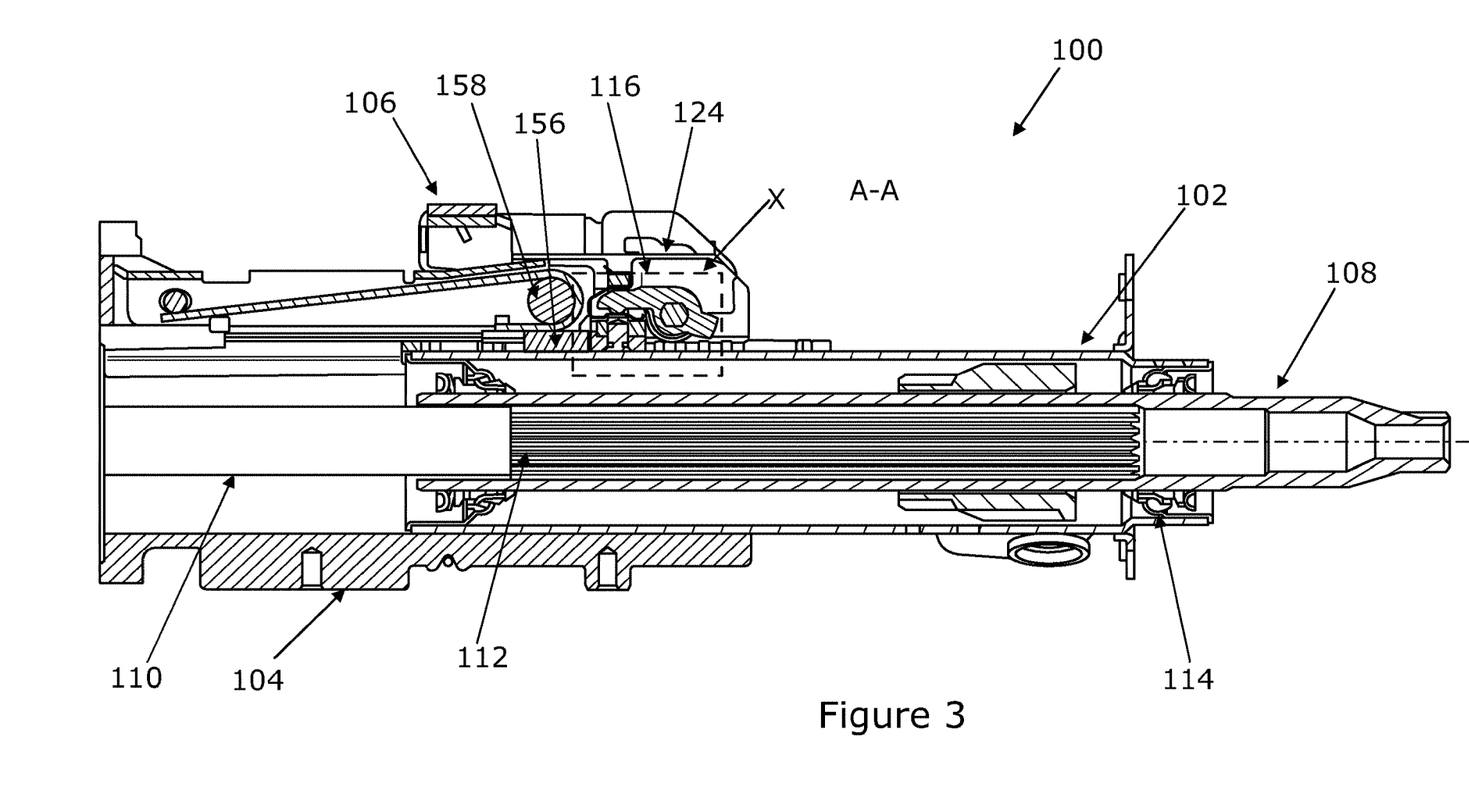
FIG. 3 is a cross-sectional representation of the steering column assembly of FIG. 2 along the line A-A.

Referring first to FIGS. 1 to 3, a steering column assembly 100 is shown, in accordance with the first aspect of the invention. The steering column assembly 100 comprises a shroud having an inner shroud portion 102 and an outer shroud portion 104, each of which comprises a substantially cylindrical tube. The shroud portions 102, 104 extend from a gearbox housing (not shown) that is fixed at a pivot point to a part of the vehicle body and also fixed to a support bracket 106 which is secured to the vehicle, typically by bolting it to a region under the dashboard at a point somewhere between the pivot and the steering wheel.

The shroud portions 102, 104 are moveable relative to each other with the end of the inner shroud portion 102 being a sliding fit within an end of the outer shroud portion 104.

The shroud 102, 104 surrounds a telescopic steering column shaft, formed of two shaft 108, 110. The shafts includes an upper shaft portion 108 that at least partially surrounds a lower shaft portion 110, although this can be reversed with the scope of the invention, the two portions being connected through complimentary axially extending splines 112. The opposite end of the upper shaft portion 108 is tapered so that it can be secured to a steering wheel (not shown). The lower shaft portion 110 is connected to the gearbox housing (not shown), which in turn connects to the road wheels of the vehicle. The skilled person will understand that the invention also applied to so-called inverted assemblies in which the moving part will slide or roll (via ball bearings or similar) over the fixed part rather than within it.

As depicted, the upper shaft portion 108 fits over the lower shaft portion 110 and can move axially whilst the lower shaft portion 110 is fixed in an axial direction. Similarly, the inner shroud portion 102 is located towards the steering wheel and slides within the outer shroud portion 104, which is also fixed in an axial direction. An upper column bearing assembly 114 is located between the upper shaft portion and the outer shroud portion. This fills the space and ensures that the shaft 108, 110 is located securely within the shroud 102, 104.

The shroud portions 102, 104 are fixed to the bracket 106 by a clamp mechanism 116. The clamp mechanism 116 can be unlocked and locked to allow the rake of the steering column shroud to be adjusted by pivoting about the pivot point. When locked the steering column shroud cannot easily be moved.

The bracket 106 includes two arms 118 which extend generally downwards in a vertical plane and extend down either side of the shroud portion 104. The bracket 106 is securable to the vehicle body using bolts (not shown) that pass through openings 120.

The clamp mechanism 116 comprises a clamp bolt 122 or pin which passes through a respective generally vertical slot 124 in each arm 118. The shape of the vertical slots 124 permits rake adjustment of the steering column shroud. One of the slots 124 includes a vertical rack 126 with a plurality of teeth. Respective cams 128 mounted on the clamp bolt 122 releasably engage with the teeth of the vertical rack 126 upon rotation of the clamp bolt 122. A lever 130 mounted adjacent to one end of the clamp bolt 122 enables this rotation. Thus, the rake of the steering column assembly 100 can be adjusted.

In order to adjust for reach, a rail 132 is provided which in the depicted embodiment is affixed to an outer surface 134 of the inner shroud portion 102. The horizontal rail 132 includes a slot 136 with two opposing sides, each provided with a row of teeth 138, each row facing the other row across the slot and extending in an axial direction along the inner shroud portion 102.

Releasably engageable with the horizontal rail 132 is a toothed block 140. The toothed block 140 includes a row of teeth on each of its sides which are shaped so as to allow engagement with the teeth of a corresponding side of the slot in the rail 132. The toothed block 140 itself is held in position by a carrier element 142 that is guided by a portion of the outer shroud portion 104. Thus, with the toothed block 140 in a clamped condition, the teeth provide positive locking of the two shroud portion through the toothed block 140 which prevents the inner shroud portion 102 moving in an axial direction unless a crash force is exceeded which will cause the block to break free of the outer shroud portion 104. The shape and function of the teeth of the toothed block and the teeth of the slot will be explained in more detail later in this description with reference to FIGS. 5 and 6a to 6c of the drawings.

The releasable engagement of the toothed block 140 is controlled by a rocker 144 which is attached to the clamp bolt 122 and positioned, in use, between the two arms 118 of the support bracket 106. The rocker 144 is shown in detail in FIG. 4.

Figure 4:
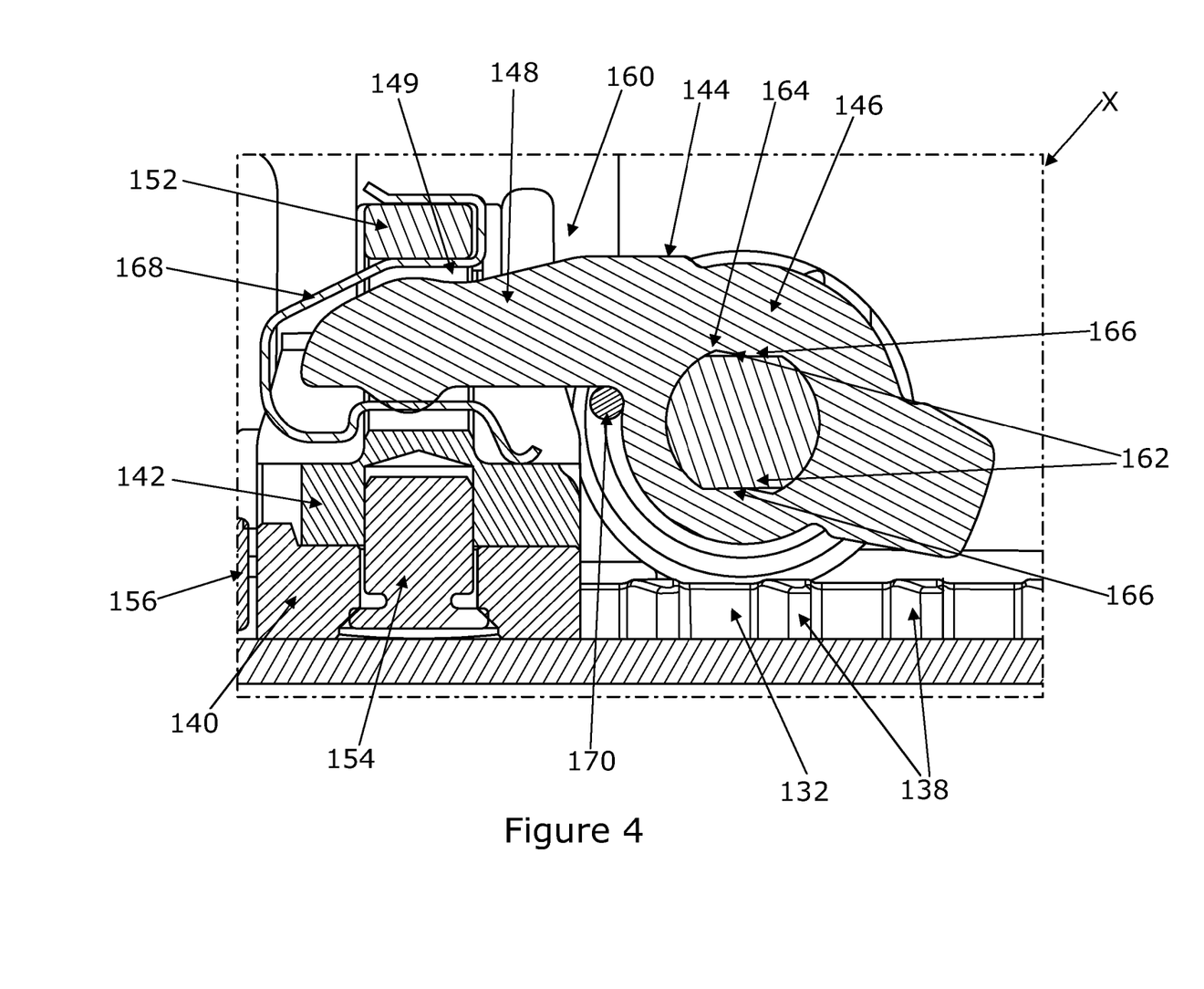
FIG. 4 is an enlarged view of the rocker, toothed block, and slot of FIG. 3.

The rocker 144 includes a main body 146 which is located about the clamp bolt 122 and a lever arm 148 which extends towards and is received within an opening 149 in the carrier element 142. The carrier element 142 is held in the outer shroud 106 within guides 150 which allow movement only in a vertical direction relative to the shroud 102, 104. As such, upon rotation of the rocker 144 in a first direction, the lever arm 148 presses against an upper portion 152 via a leaf spring 168 of the carrier element 142, causing the movement of the carrier element 142 away from the horizontal rack 132 and drawing the toothed block 140 out of engagement. Upon rotation of the rocker 144 in a second direction opposite to the first direction, the carrier element 142 is lowered and the toothed block 140 is engaged with the rail 132.

The toothed block 140 is separable from the carrier element 142 in the event of a large force being exerted on the toothed block 140, for example in the event of a crash in which the driver of the vehicle impacts the steering wheel. The toothed block 140 is connected to the carrier element 142 by way of a frangible pin 154. The frangible pin 154 is configured to break upon the application of a predetermined force, which can thus be configured to be the force likely to be endured in a crash situation. The breaking of the frangible pin 154 occurs as the inner shroud portion 102 initially moves slightly to bring the flanks of the teeth on the block with the flanks of the teeth of the first side of the slot, further movement of the inner shroud portion moving the block which breaks the pin 154.

During collapse, the toothed block 140 will after further movement impact upon, and move a puller 156. The puller 156 comprises a plate with a strip of material attached to it, usually metal, which is deformed around an anvil 158 upon movement of the toothed block 140. As such, the collapse of the steering column assembly 100 is controlled.

As an additional feature, a leaf spring 168 is positioned at least partially between the lever arm 148 and the carrier element 142 when the clamp mechanism 116 is in the clamped position. Advantageously, the leaf spring 168 also reduces rattle of the carrier element 142, ensuring that the assembly feels of a high quality to a user. The leaf spring 168 is fixed onto the upper portion 152 of the carrier element 142 and extends over an end of the lever arm 148. When the lever arm 148 moves clockwise, the leaf spring 168 does not absorb any of the motion and the lever arm 148 forces the carrier element 142 to move upwards in the guides 150. However, when the lever arm 148 moves anticlockwise, the spring 168 deflects to accommodate the motion once the toothed block 140 is engaged, causing the biasing force to be applied to the toothed block 140 and providing increased force feedback to the user, such that they are aware that the toothed block 140 is engaged with the horizontal rack 132. In order to assist with the depression of the leaf spring 168, the lever arm 148 includes a protrusion which engages with the leaf spring 168 throughout the motion. Alternatively, the protrusion may be found on the leaf spring 168 itself.

A coil spring 170 is provided which locates the rocker 144 in the centre of the clamp bolt 122. The coil spring 170 resists any substantial lateral movement of the rocker 144 along the clamp bolt 122 whilst preventing or limiting the transmission of vibrations between the support bracket 106, clamp bolt 122, and rocker 144, lowering the chances of unwanted rattle.

Figure 5:
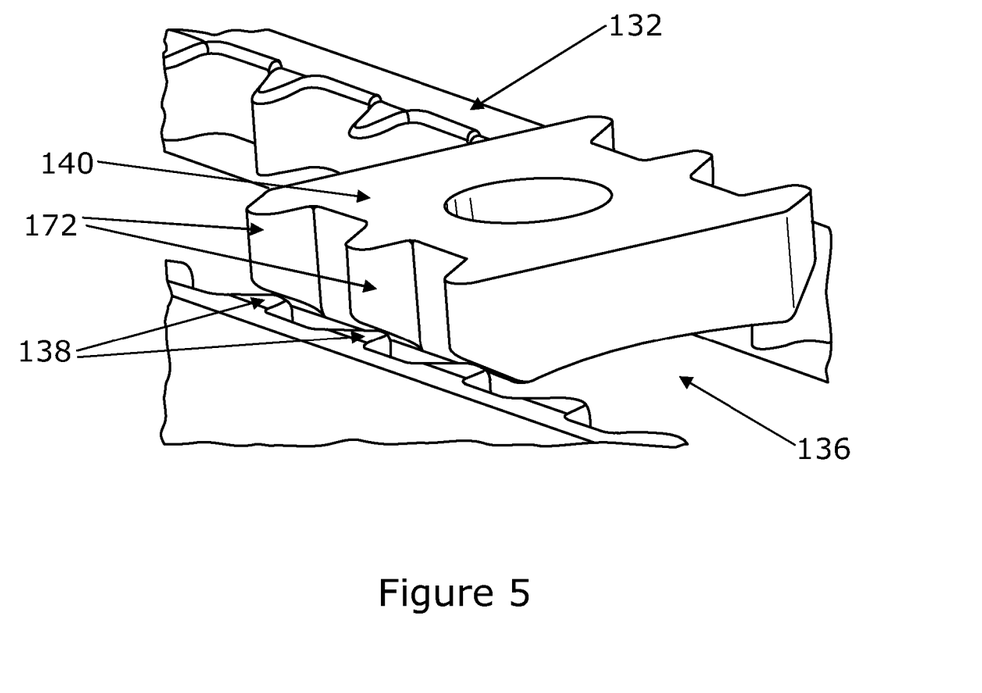
FIG. 5 shows the toothed block held in the unclamped position with the teeth of the toothed block clear of the teeth of the slot but with the teeth of one side of the toothed block directly above the teeth of the slot.

When moving from the unclamped position shown in FIG. 5 to the clamped position, the toothed block 140 will be pushed down into the slot 136 until the teeth 172 of the toothed block 140 are in the plane of the teeth 138 of the slot 136. During this motion, the toothed block 140 may move sideways if the teeth 172 on one side of the toothed block 140 are located fully, or partially, above any of the teeth 138 of the slot 136. The sideways thrust is achieved because of the sloped or curved shape of the top of the teeth 138 of the slot 136 and the shape of the underside of the teeth 172 of the block 140. If there is no tooth on tooth contact, the block 140 will come to rest aligned with the functional first side of the slot.

Figure 8:
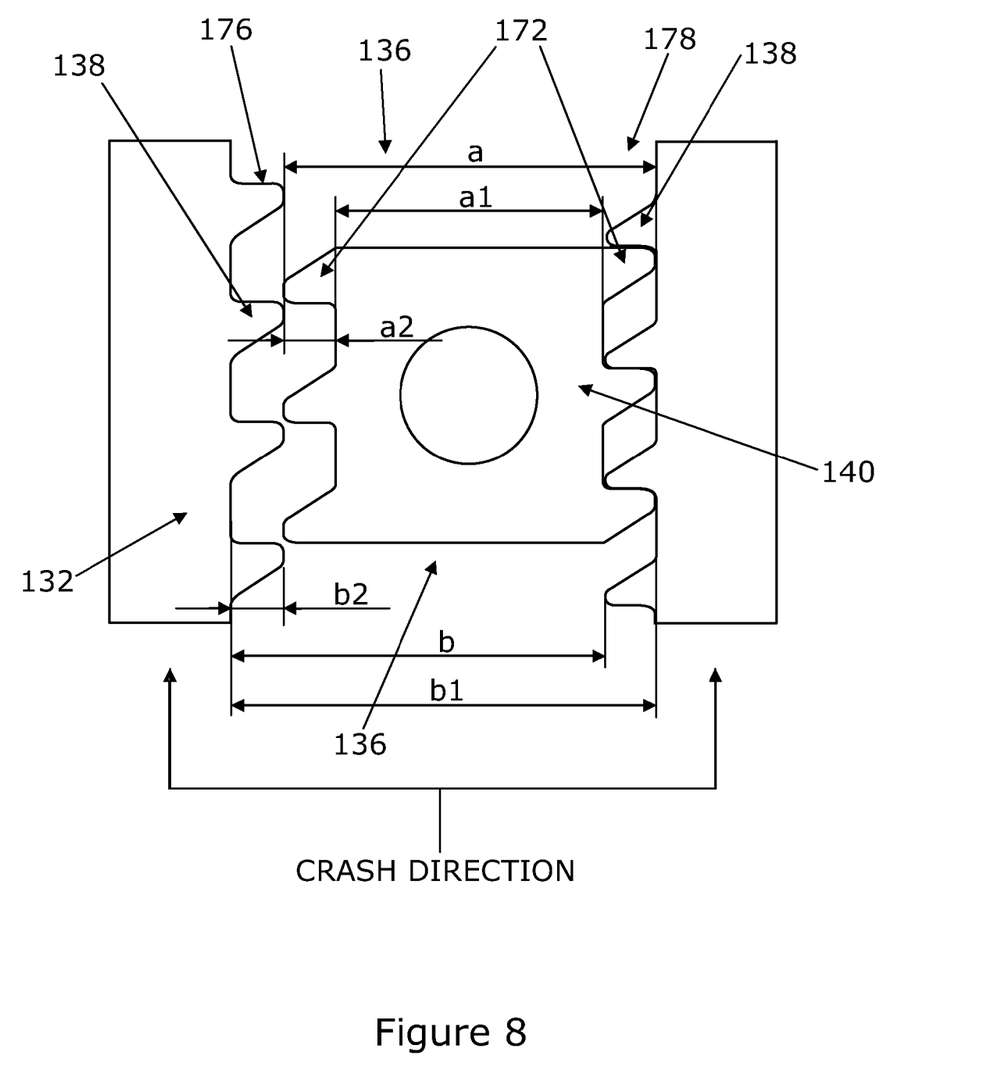
FIGS. 8 to 10 show the various dimensions of the teeth, the slot, and toothed block and are marked using the terms that have been used throughout the description.
Figure 9:
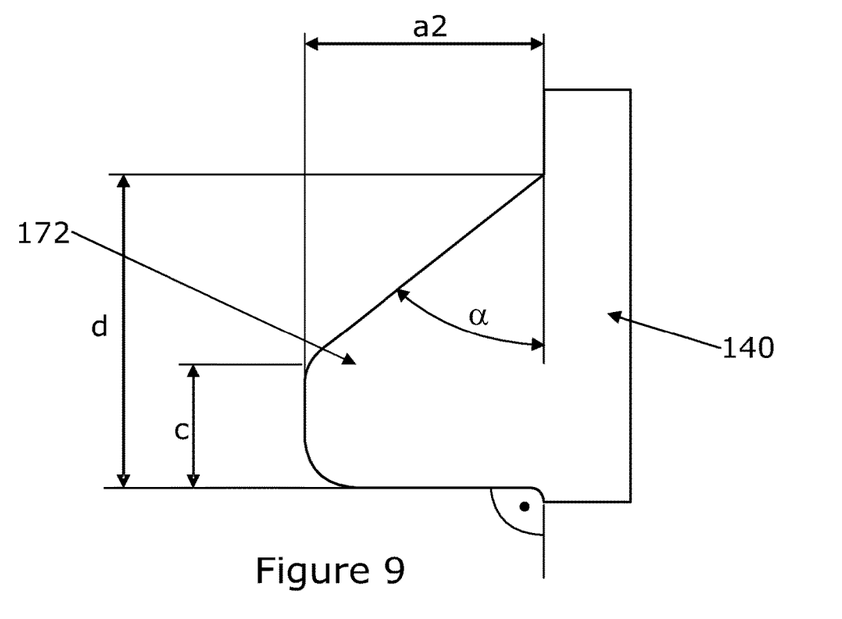
Figure 10:
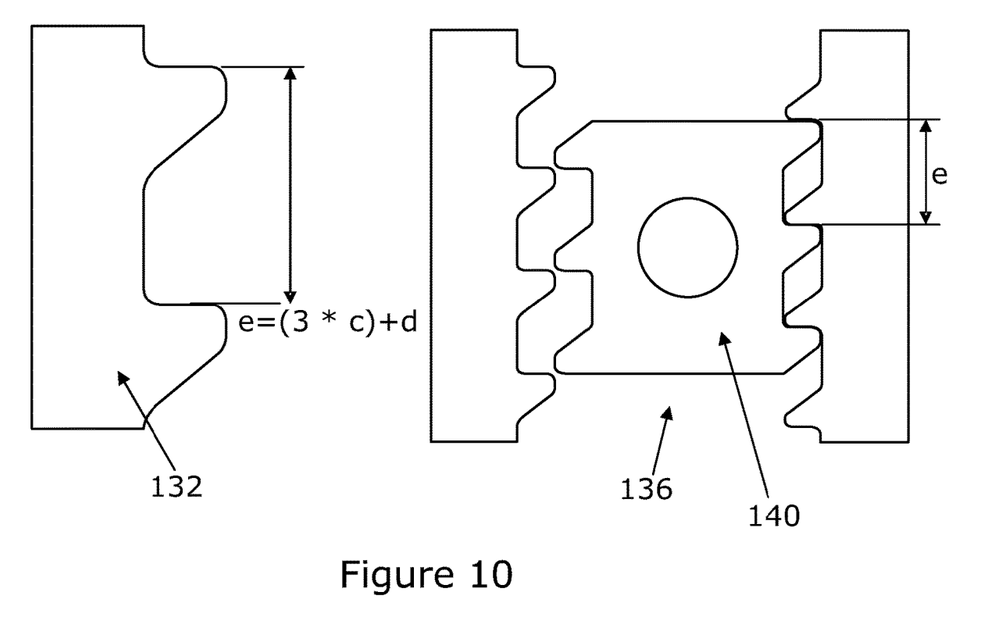

As can be seen in FIG. 8, the teeth 138 on one side of the slot 136 are offset from the teeth 138 on the other. In this example they are offset by one half pitch. Also the tips of the teeth 138 on the sides of the slot 136 face across the slot 136 towards each other, and the teeth 172 of the toothed block 140 face outwards from the sides of the block 140. This offset is crucial in ensuring that if a tooth on tooth situation arises between the block and the functional teeth on the first side of the slot there is a space on the second side of the slot for the teeth of the block to move into. The teeth on the block must not be offset for this to be possible.

Figure 6A:
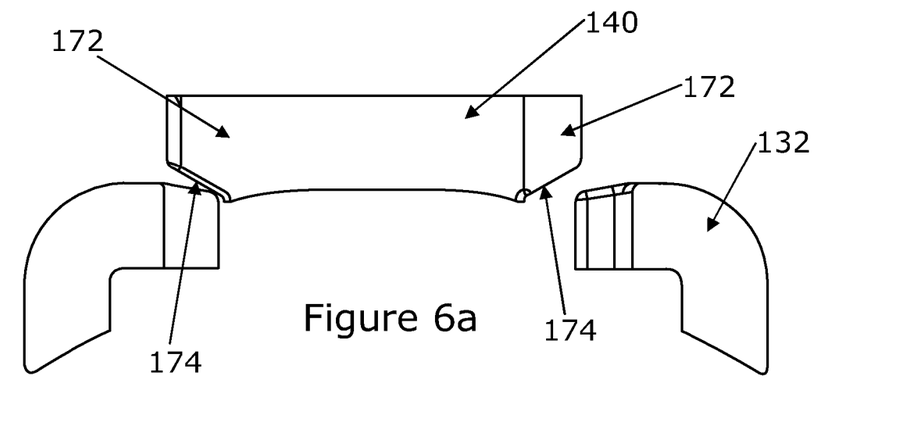
FIGS. 6a to 6c shows the path of travel of the toothed block from the unclamped position shown in FIG. 6 to the clamped position, the toothed block moving down into the slot and also being displaced to the non-functional second side of the slot by the ramps on the sides of the teeth on the functional first side.
Figure 6B:
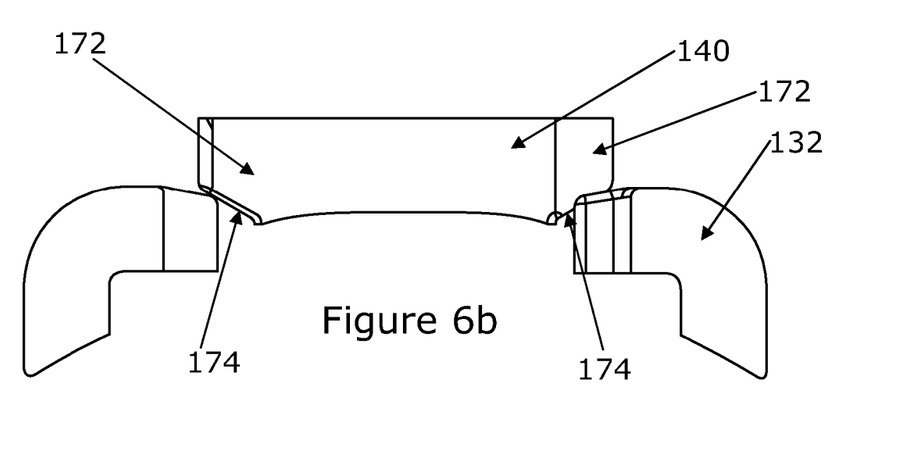
Figure 6C:
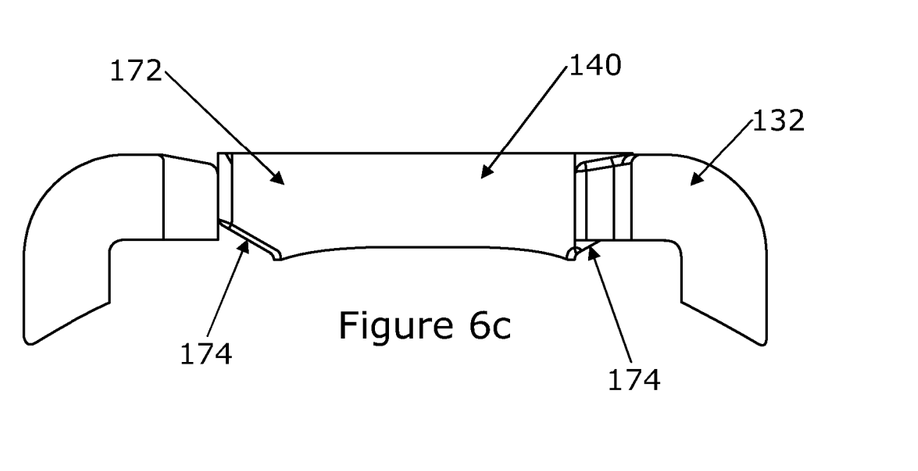
Figure 7A:
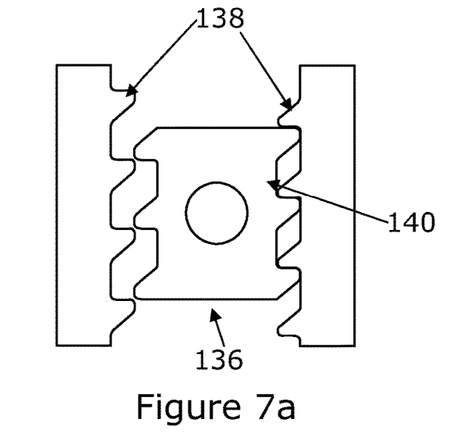
FIGS. 7a to 7f show the movement of the toothed block across and along the slot during a crash in which the toothed block starts off in a position on the non-functional second side of the slot and ends up on the functional first side where it prevents further movement as the teeth of the functional side come into flank on flank contact.
Figure 7B:
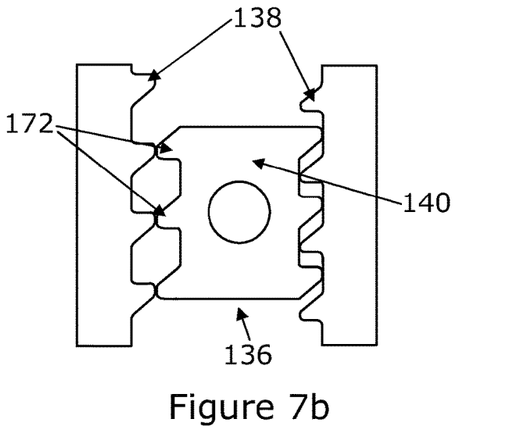
Figure 7C:
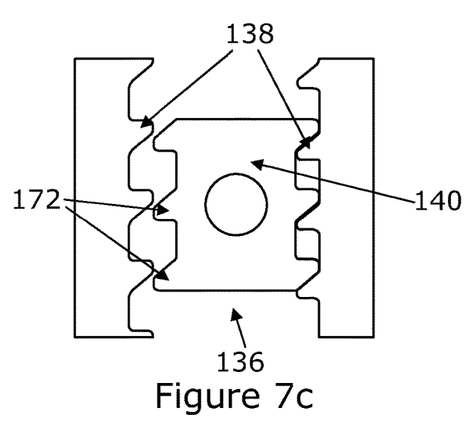
Figure 7D:
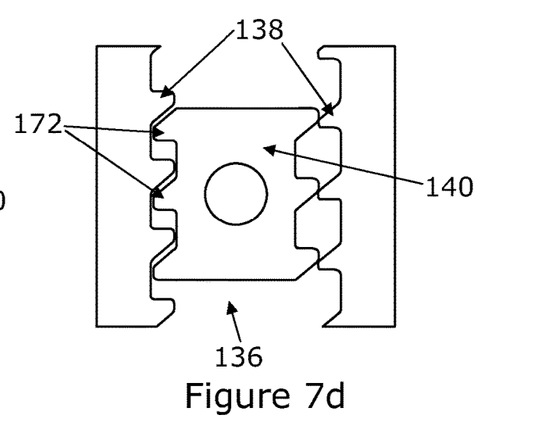
Figure 7E:
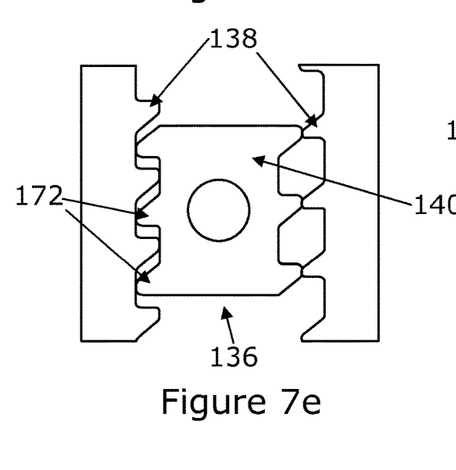
Figure 7F:
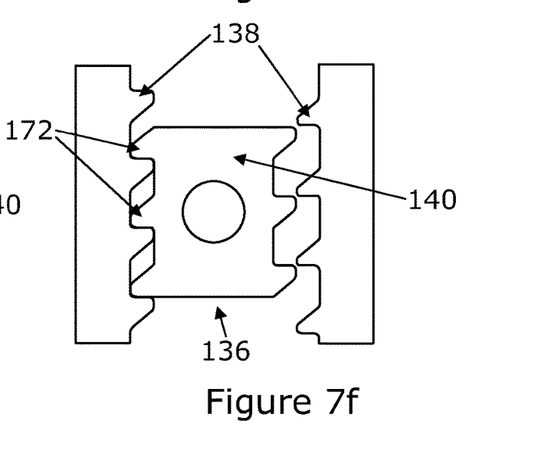

FIGS. 6a to 6c show how the toothed block 140 will move sideways when a tooth on tooth collision occurs, allowing it to rest in the fully clamped condition within the slot 136 without being blocked. Sloped ramps or curves 174 on the sides of the teeth 172 help provide the sideways thrust that is needed, and the offset of the teeth 172 ensures there is always a space for the toothed block 140 to move down into once the end of the ramps 174 has been reached.

When clamped in the position shown in FIG. 6c, the inner shroud portion 102 cannot move telescopically by any significant amount in either axial direction because of friction between the two shroud portions. The teeth of the block and of the slot may or may not at that time be in flank to flank contact. Movement in the collapse direction of the shroud is blocked immediately flank to flank contact occurs if the toothed block 140—following clamping—is on the functional side of the slot 136. If it is on the non-functional side a small amount of movement is possible as the non-functional side teeth push the toothed block 140 across to the functional side of the slot 136. Friction in the system means that a reasonable amount of force is needed for this to happen.

In the event of a crash, at low forces the friction between the inner and outer shroud portions will prevent movement of the shroud but at higher forces that cause a small initial movement of the inner shroud relative to the outer shroud, the block will be carried with the slot and cause the pin 154 that connects the toothed block 140 to the carrier element 142 to shear. This allows the toothed block 140 to be carried along in the slot 136, so that the inner shroud portion 102 can collapse further. An energy absorbing mechanism must be provided that absorbs energy associated with this collapse movement if it is to be controlled. This may act between the toothed block 140 and the outer shroud 106, so that as the toothed block 140 moves away from the carrier element 142 it activates the energy absorbing mechanism.

The teeth 138, 172 of the four rows—two on the toothed block 140 and two on the slot 136—are different on one side of the slot 136 compared with the other. This can best be seen in FIG. 8 of the drawings.

Specifically, as shown the teeth 138 of a first row 176 of the slot (on the left in FIG. 8) and the corresponding teeth 172 of the toothed block 140 (also on the left) have a zero pressure angle on their flanks that engage when the inner shroud portion 102 moves in a collapse direction (upwards movement of the slot 136 as shown in FIG. 8). This ensures that when those flanks come into contact they prevent any further axial movement of the toothed block 140 along the slot 136 in a direction corresponding to a telescopic collapse of the shroud. As can be seen contact is over a wide flat area of each flank. The left hand side of the slot 136 and toothed block 140 in FIG. 8 is considered to be the functional side 176 of the slot 136.

The teeth of a second row 178 on the right side of the slot 136 as shown in FIG. 8 and the corresponding teeth of the toothed block 140 have a much higher flank angle of 50 degrees on the flanks that contact each other in a collapse of the shroud. This means that once the flanks come into contact, further axial movement of the shroud relative to the toothed block 140 is possible which results in the toothed block 140 moving sideways across the slot 136 towards the functional first side. The left hand side teeth therefore do not prevent the axial collapse and are considered to be the non-functional side 178.

FIGS. 7a to 7f show the function of these teeth 138, 172 during movement of the toothed block 140 along the slot 136, when starting from a position in which the toothed block 140 is aligned with the non-functional side 178 of the slot 136. The slot 136 moves up the page starting at a low position in FIG. 7a and a higher position in FIG. 7f which marks the end of the allowable collapse travel of the shroud and slot 136. As can be seen the non-functional teeth 178 push the toothed block 140 over to the functional side 176, then guide it along the functional side 176 until eventually the flanks of the teeth on the functional side 176 engage and prevent further movement.

The teeth 138, 172 may have a range of different sizes, shapes and pitches. In a most preferred arrangement the teeth 138, 172 satisfy the following conditions;

Pitch of teeth, e, for all four rows is the same;

Height of all the teeth is the same—a2 is the height of the teeth of the toothed block and b2 is the height of the teeth of the slot;

Width of the toothed block a1 not including the height of the teeth on the toothed block satisfies the equation a1=b1−3*a2=>a2=(b1−a1)/3

Where b1 is the width of the slot including the teeth (i.e. from the base of the slot teeth)

The width of the toothed block including the toothed block teeth is given by the equation:

$$a = a1 + 2*a2$$

The height of each tooth is given be the parameters a1 and b1 as shown in FIG. 8. A Higher tooth can be chosen if a higher shear tooth strength is desired but in each case a must be always equal or smaller (also in tolerances) than b (where b=b1−b2) to provide smooth engagement and movement of Reach tooth block.

The flank angle α of the teeth flanks that are required to move the toothed block across the slot in the example shown is set at 50° although this can be varied and will depend on the coefficient of friction of the flanks. As a guide, a Minimum angle for smooth sliding of tooth on non-functional side with metal to metal flank contact may be set at 45°.

Figure 11:
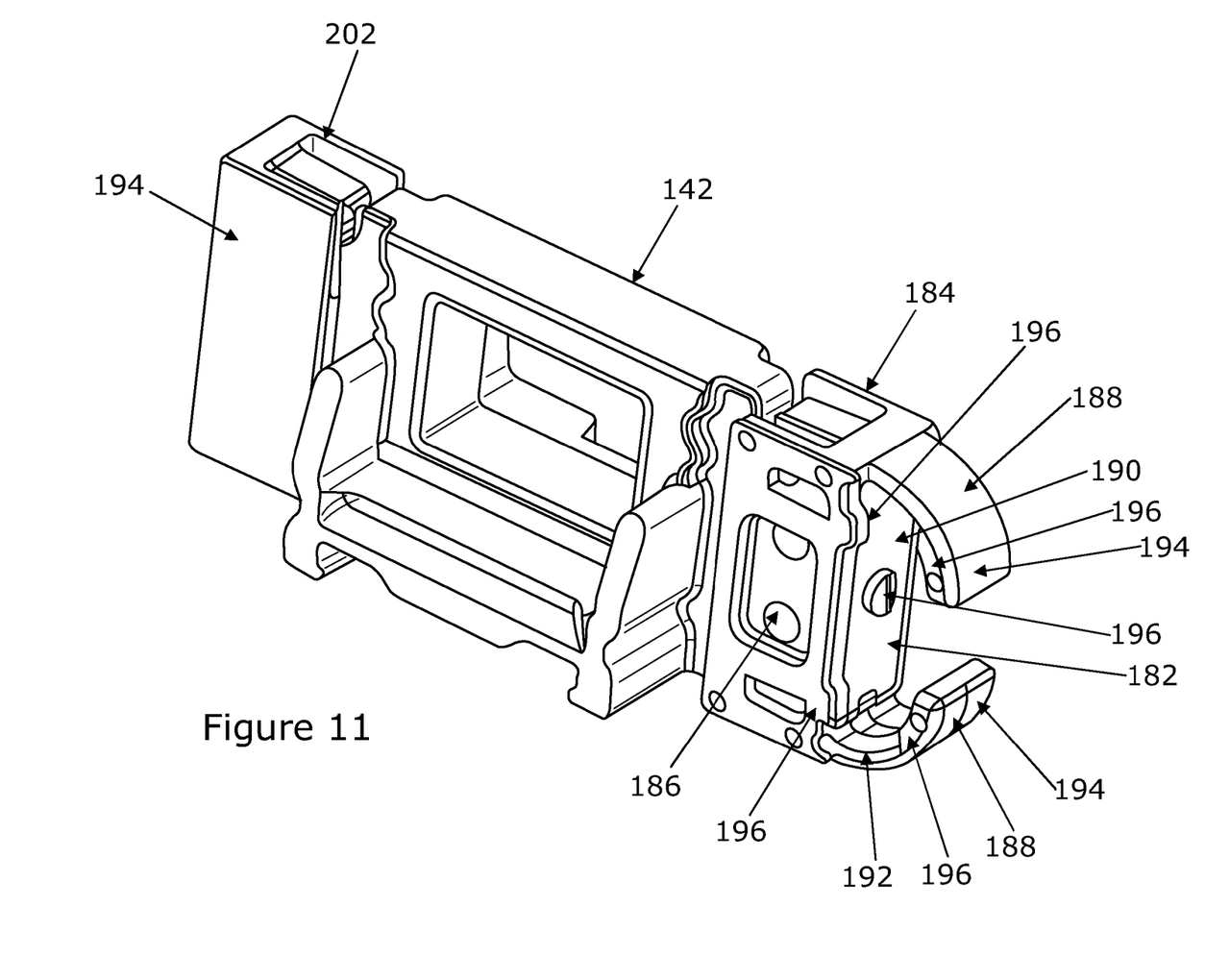
FIG. 11 is a perspective view of the carrier in isolation, including the spring housing and spring.

In order to further encourage the block 140 into engagement with the functional side 176, a biasing spring 182 is provided, as shown in FIG. 11. In the depicted embodiment, the biasing spring 182 is positioned on one side of the carrier 142 such that, in use, the biasing spring 182 applies a biasing force between the guides 150 and the carrier element 142. This biasing force therefore urges the carrier 142, and thus the block 140, towards the functional side 176, ensuring the block is in the optimum position for fast engagement during a crash.

The biasing spring 182, formed as a leaf spring in the present embodiment, is housed within a spring housing 184 which is rigidly connected to the carrier 142. As such, the carrier 142 and spring housing 184 move together, when subjected to external forces.

The spring housing 184 comprises a substantially cuboidal body 186 and two protruding arms 188. The arms 188 curve inward from the upper and lower ends of the body 186, each having a quarter-circle shape, in cross-section. The biasing spring 182 has substantially the same shape as the interior surfaces of the spring housing 184, with a flat central portion 190 and two curved arm portions 192. The spring housing 184 therefore surrounds the outer surfaces of the biasing spring 182. In use, the arms 188 of the spring housing 184 and the arm portions 192 of the biasing spring 182 deform together.

The spring housing 184 preferably includes a low-friction surface 194, at least on its outward-facing faces. This low-friction surface 194 therefore allows the spring housing 184 to slide within the guides 150 with minimal resistance. The low-friction surface 194 could be provided through the use of a low-friction, or self-lubricating, material to form the spring housing 184, or could alternatively be applied to the outside of the spring housing 184 as a separate layer.

The present arrangement is beneficial as the low-friction surface 194 of the arms 188 of the spring housing 184 come into contact with the guide 150 whilst the biasing spring 182 itself does not. Thus, the biasing spring 182 is protected from wear and damage by the spring housing 184. However, the biasing spring 182 could instead be mounted directly to the carrier 142 and slide within the guides 150, removing the need for the spring housing 184.

Figure 12A:
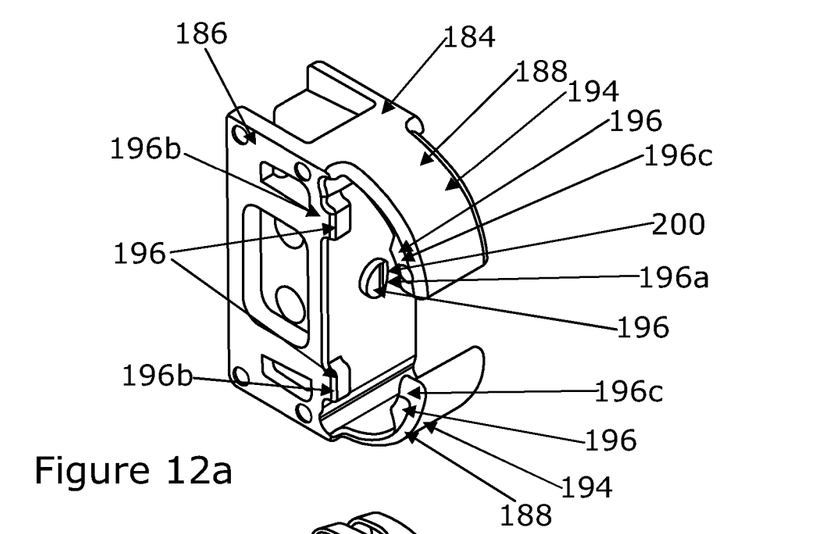
FIGS. 12a to 12c show the spring housing in isolation, the spring in isolation, and the spring housing and spring in combination, respectively.
Figure 12B:
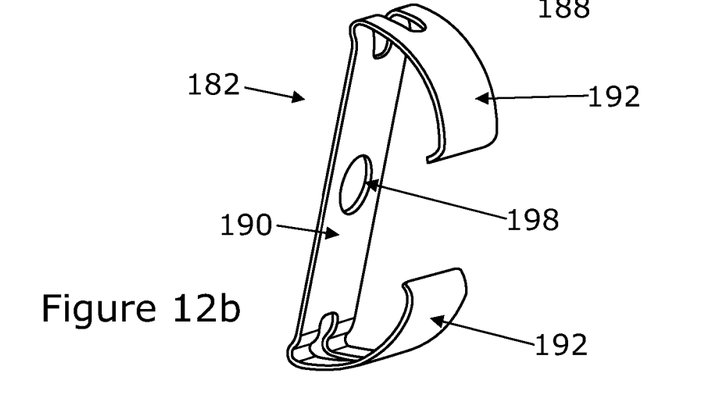
Figure 12C:
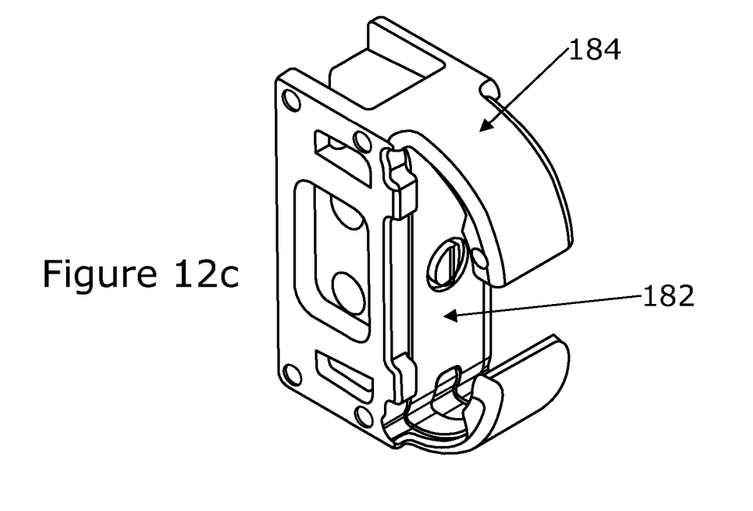

A number of retaining elements 196 are formed on the spring housing 184 which help to retain the biasing spring 182 in the correct position. These retaining elements 196 either pass through apertures 198 in the biasing spring 182, as in the case of the central retaining element 196a, or are located such that they abut the side of the biasing spring 182. In the depicted embodiment, and as shown in FIG. 12a, two retaining elements 196b are found on one side of the body 186 of the spring housing 184, one retaining element 196c is found on the same side of each of the arms 188 of the spring housing 184, and the central retaining element 196a is positioned in the centre of the inner face of the body 186.

As can be seen, the central retaining element 196a includes a chamfer 200. The chamfer 200 is angled such that it faces in the direction in which the biasing spring 182 is introduced, during assembly. This chamfer 200, along with the positions of the retaining elements 196, assists with the assembly of the biasing spring 182 and spring housing 184. The biasing spring 182 can therefore be slid into engagement with the spring housing 184 from the side opposite to that including the retaining elements 196b, 196c. The biasing spring 182 will therefore slide up the chamfer 200 until the central retaining element 196a is located within the aperture 198 in the biasing spring 182, at which point the retaining elements 196 will prevent any further movement of the biasing spring 182 which could result in it becoming disconnected from the spring housing 184.

Although depicted as being a separate part, which assists with ease of assembly, the spring housing 184 could be formed integrally with the carrier 142. Thus, the total number of parts required could be reduced.

On the opposite side of the carrier 142 to the spring housing 184 is an abutment block 202. The abutment block 202 is receivable within the guides 150 of the carrier 142 and provides two functions. Firstly, the abutment block 202 includes a low-friction surface 194, formed either integrally or as a surface coating, which assists with the movement of the carrier 142 within the guides 150. In addition, the abutment block 202 prevents any movement of the carrier 142 beyond that which is required to engage the toothed block 140 with the functional teeth 176. As with the spring housing 184, the abutment block 202 may be formed integrally with the carrier 142, if desired.

Although the biasing spring 182 is depicted as a leaf spring, it is also possible to utilise any other type of spring such as a coil spring, or may be a leaf spring which has a different shape to that which is shown. Where a different type of spring is used, and it is still desired to use a spring housing, the spring housing may be redesigned to better conform and protect the biasing spring 182.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising:
a telescopic shroud having an outer shroud portion and an inner shroud portion, an end of the inner shroud portion extending into the outer shroud portion,
a rail fixed to the inner shroud portion including a slot that extends axially along the inner shroud portion, the slot defining two opposing sides which each side carries a row of teeth, the two rows of teeth thereby being spaced apart from one another with the teeth extending towards each other;
a clamp bolt that extends perpendicular to the shroud that is configured to be rotated around an axis thereof by operation of a locking lever,
a toothed block having a row of teeth on each side, a pitch between teeth of each row being equal to, or a whole multiple of, the pitch of the teeth of the corresponding row of the slot,
the toothed block being supported by a carrier that moves in response to rotation of the clamp bolt to in turn move the toothed block between a clamped position in which the toothed block is located in the slot with the teeth of the toothed block in the same plane as the teeth of the slot and an unclamped position in which the toothed block is held such that the teeth of the toothed block are out of the plane of the teeth of the slot;
the carrier supporting the toothed block such that the toothed block is free to move from side to side when in the slot,
the teeth of the two rows of teeth of the slot and the teeth of the two rows of teeth of the toothed block are shaped such that for any given position of the inner shroud portion relative to the outer shroud portion the toothed block is free to move into the slot when the carrier is in moved into the clamped position from the unclamped,
wherein the teeth of a first side of the slot and the corresponding teeth of the toothed block when in flank to flank contact prevent axial movement of the toothed block along the slot in a direction corresponding to a telescopic collapse of the shroud and in that the teeth of a second side of the slot and the corresponding teeth of the toothed block permit axial movement of the toothed block along the slot in a direction corresponding to a collapse of the shroud whilst applying a thrust to the toothed block that moves the toothed block sideways across the slot so that the flanks of the teeth of the first side face the flanks of the corresponding teeth of the toothed block, and wherein the carrier includes a biasing spring which, when the steering column assembly is in the unclamped position, biases the toothed block in a direction substantially perpendicular to the movement between the clamped and unclamped positions, towards the teeth of the first side of the slot.

2. The steering column assembly as claimed in claim 1, wherein the biasing spring is configured to exert a biasing force on the outer shroud portion in the unclamped condition.

3. The steering column assembly as claimed in claim 2, wherein the outer shroud portion includes at least one guide to guide the movement of the carrier, the biasing spring being configured to exert a biasing force on the at least one guide.

4. The steering column assembly as claimed in claim 1, wherein the biasing spring is movable with the carrier.

5. The steering column assembly as claimed in claim 1, wherein the biasing spring is housed within a spring housing.

6. The steering column assembly as claimed in claim 5, wherein the spring housing surrounds or substantially surrounds an outer surface of the biasing spring.

7. The steering column assembly as claimed in claim 5, wherein the spring housing includes at least one retaining element which, in use, is configured to restrict movement of the biasing spring in at least one direction.

8. The steering column assembly as claimed in claim 7, wherein the at least one retaining element is receivable within a corresponding aperture in the biasing spring.

9. The steering column assembly as claimed in claim 8, wherein the at least one retaining element includes a chamfer angled such that it faces in the direction in which the biasing spring is introduced, during assembly.

10. The steering column assembly as claimed in claim 5, wherein the spring housing is attachable to the carrier.

11. The steering column assembly as claimed in claim 5, wherein the spring housing includes a low-friction surface on a portion which contacts the outer shroud portion.

12. The steering column assembly as claimed in claim 1, wherein the biasing spring is a leaf spring.

* * * * *